Patented Dec. 16, 1941

2,266,360

UNITED STATES PATENT OFFICE 2,266,360

METHOD OF PRESERVING METAL AND OTHER SURFACES

Thomas Oliver Edwards, Jr., Associated, and Stanley Russell Williams, Concord, Calif., assignors to Tide Water Associated Oil Company, San Francisco, Calif., a corporation of Delaware No Drawing. Application August 1, 1938, Serial No. 222,538

6 Claims. (Cl. 196—13)

This invention relates to improvements in surfacing materials and has for a principal object the provision of a method whereby surfaces of practially any character are protected, to remain protected for vastly extended periods, against deterioration, such as may be caused for instance by oxidation and/or other chemical action.

Another object is to provide material for use as a paint, or covering for metals, such as iron or steel, subject to high temperatures up to the order of 1200° F., or higher, which is of such tenacious character that it will not readily warp, crack, chip, split, peel, space, or run, under the influence of such high temperatures, whereby the heated surfaces so covered are protected from the damaging influence of chemical action at both low and high temperatures for greatly extended periods of time.

Other objects will become apparent, as the use of the method and materials hereinafter becomes more fully disclosed.

Heretofore, the surfacing of metals, wood, stone, concrete, etc., with various protective materials generally involved the surface application of paints of various characters, the film forming body of which comprises an oil of drying properties, or a resinous substance, or cellullose esters such as nitrocellulose or acetyl cellulose. The paint may or may not contain besides the film forming constituents a pigment. A solvent is used to keep the film forming constituents in solution and to enable the application of the paint by either brush, spray, dipping, impregnation under pressure, etc.

In the protection of highly heated surfaces, metals or otherwise, the use of such well known materials results in the loss of such coverings in a relatively short period of time due to melting, peeling, chipping and even gradual vaporization of the constituents. Above a certain temperature chemical changes in the film itself and accelerated deterioration by the action of air or other gases coming in contact with the surface will set in, so that the cost of applying ordinary materials to the heated surface becomes a total loss followed by increased deterioration of the surface by chemical action which ultimately requires that the part to be protected must be replaced.

This is especially noticeable, for instance, in metal chimneys; smokestacks; stoves; exhaust manifolds, exhaust pipes and mufflers of internal combustion engines; castings, pipes and apparatus generally used in oil refineries, and particularly as used in high temperature cracking apparatus where the temperatures will often exceed 500° F., and go as high as 1600° F., or higher; and in innumerable places in the various arts where surfaces more or less heated should be surfaced to protect the same against chemical action occurring through a variety of agencies because of increased chemical action which takes place at increased temperatures.

It may be asserted that, within definite ranges of temperatures from 100° F., upwards, none of the above well known paint coverings, including asphalt, are suitable as permanent protective coverings where they are subject to chemical actions, such as evolve from contact with corrosive or destructive gases like $CO_2$, $SO_2$, $H_2S$, $HCl$ and the like, or salts, in the presence of moisture and particularly under the influence of temperatures increased above normal or atmospheric temperatures, or with chemical action at sub-normal temperatures. Exceptions, of course, are such high temperature protective coverings like baked enamels, or porcelains, of a highly refractory character as are entirely outside the scope of commercial applications to which the present invention is directed, as equivalents.

The ordinary paint, or protective surfaces, described deteriorate at a greater or less rate depending on conditions to which they are subject, but deterioration and, at high temperatures, absolute inefficiency is well recognized.

These deficiencies in ordinary protective materials are now overcome in the present invention by the use of a material of high penetrating power and of such stability to heat and chemical action that it functions as a preservative surface under almost any condition where such a surface is required, or desired to be maintained without extended and expensive renewals.

The material itself may be described as comprising largely non-volatile polymerzed hydrocarbons of high molecular weight, of low hydrogen content, and of the polynuclear cyclic type.

The preferred method of obtaining this material is to treat a hydrocarbon distillate by the well known liquid sulphur dioxide process, or by other selective solvent processes. As a result of this treatment there is obtained, as is well known, an $SO_2$ insoluble portion or raffinate consisting chiefly of saturated hydrocarbons and an $SO_2$ soluble portion or extract rich in aromatic hydrocarbons. The extract thus obtained is subjected to a cracking operation whereby a portion of the aromatic constituents become polymerized to form polynuclear cyclic bodies which are extremely heat resistant and form the bases of the desired material. Since the aromatic constituents of the extract are themselves relatively heat resistant, high temperatures of the order of 900° to 1200° F., are used in the cracking operation with a preferred range of 1000° to 1050° F. The products of the cracking operation are separated, as is customary in cracking processes, into three fractions by distillation. The first fraction, being low boiling constituents, is suitable for motor fuel. The second fraction has roughly the same boiling range as the extract charged and may preferably be recycled to the cracking operation. The third fraction, normally called the cracked residuum, contains the desired polymerized, polynuclear cyclic hydrocarbons. The viscosity of this cracked residuum will depend on the temperature and pressure conditions during the distillation. For instance, a cracked residuum may be obtained which is sufficiently fluid to be applied directly as the desired protective coating. When applied to hot surfaces or surfaces which later become heated the volatile portions either evaporate to leave a desired protective film, or the more readily reactive portions oxidize and/or polymerize and assist in the formation of the protective film. On the other hand, the distillation may be carried on to such an extent that only non-volatile constituents remain. These non-volatile constituents comprise largely the desired polymerized polynuclear cyclic hydrocarbons and, if of too viscous consistency for application to surfaces, may be mixed with various thinners which are separated therefrom after application to a surface by evaporation, absorption, heat, or other physical phenomena.

For further explanation the following example is given:

Example 1

A raw kerosene distillate from California crude oil having a boiling range of 350° to 590° F., was treated with an equal volume of liquid sulphur dioxide at a temperature between 15° and 20° F. From this treatment 75% by volume of the raw distillate was recovered as a finished kerosene and 25% by volume was recovered as extract having the following properties:

| | | |
|---|---|---|
| Gravity | °A. P. I.. | 27 |
| Aniline point | °F.. | 38 |
| A. S. T. M. initial boiling point | °F.. | 354 |
| A. S. T. M. 10% point | °F.. | 395 |
| A. S. T. M. 50% point | °F.. | 437 |
| T. S. T. M. 90% point | °F.. | 531 |
| A. S. T. M. end point | °F.. | 592 |

The extract thus obtained was cracked at a temperature between 1000° and 1025° F., under a pressure of 300 pounds per square inch. The reaction products from this cracking operation were fractionally distilled to yield (a) pressure distillate, (b) recycle oil, and (c) cracked residuum. The pressure distillate and the cracked residuum were withdrawn from the operation and the recycle oil was reintroduced to the cracking process with the fresh kerosene extract. As an overall result of this operation there were obtained the following approximate yields:

| | Per cent |
|---|---|
| Pressure distillate | 60 |
| Cracked residuum | 30 |
| Gas loss | 10 |

The cracked residuum thus obtained had to the following properties:

| | | |
|---|---|---|
| Gravity | °A. P. I.. | 5.2 |
| Flash | °F.. | 215 |
| Fire | °F.. | 300 |
| Viscosity, S. U. at 100° F. | seconds.. | 66 |

This cracked residuum was found to be satisfactory for application as the desired protective coating. However, a portion of the cracked residuum was redistilled under a vacuum of 20 mm. mercury absolute pressure and at a temperature of 500° F., and was found to yield a non-volatile residue comprising chiefly polymerized polynuclear cyclic hydrocarbons. Upon dissolving the residue in benzol a satisfactory solution was obtained for application as the desired protective coating.

While the preferred charging stock for the solvent refining process used above is a hydrocarbon distillate, and may be advantageously a raw kerosene distillate from petroleum, any hydrocarbon oil may be used providing it is originally asphalt free or has had the asphalt removed previous to the cracking operation. Also any hydrocarbon distillate is suitable for the process, for instance the so-called recycle stock of a cracking operation may be used. The presence of asphalt causes trouble in the cracking operation by the excessive formation of carbon, particularly at the high cracking temperatures required for effective cracking of the refractory solvent extract. Furthermore the presence of asphaltic matter in the cracked residuum will cause poor adhesion of the protective coating and will promote peeling particularly at high temperatures.

The invention contemplates cracking the solvent extract by any of the well known processes, providing the temperature conditions are sufficiently high to effectively act on the refractory aromatic constituents of the extract. Thus the cracking may be carried on in the vapor phase under pressures as low as 100 pounds per square inch, or the cracking may be performed in the liquid phase, or a combination liquid and vapor phase, at pressures up to 1000 pounds per square inch.

Although the preferred method for obtaining the desired material for use as a protective coating is by cracking an oil rich in aromatic hydrocarbons, such as a liquid sulphur dioxide extract, yet it may be noted that polymerized polynuclear cyclic hydrocarbons are present in the cracked residuum obtained from cracking normal stocks such as gas oil and fuel oil. These compounds ordinarily are not present in such cracked residuum in sufficient quantity to render them effective as a desired protective coating, however they may be concentrated by a selective solvent as set forth below.

Cracked residuum from the cracking of gas oil or fuel oil may be extracted with a selective solvent such as liquid sulphur dioxide. The extract from this solvent refining step will contain polymerized polynuclear cyclic hydrocarbons in sufficient concentration as to be useful for the desired protective material. In case the cracked residuum contains asphaltic matter, this should first be removed before treatment with the selective solvent.

In order to free the thus cracked residue from substantially all asphaltic products (if any are contained therein), it is desirable to treat the same with a saturated solvent oil of such character that the asphalt is all precipitated and separated and the solvent oil may then be distilled off. The solvent oil may be practically any saturated oil, preferably one previously treated with liquid $SO_2$ and preferably of a boiling range higher than kerosene. If the cracked residue contains no asphaltic compounds, the solvent oil treatment is unnecessary.

After precipitation of the asphalt the solvent oil and oily material of the residuum is distilled off. The residue is then treated with liquid sulphur dioxide or other selective solvent.

The following example is illustrative of the method of obtaining the desired material from cracking an asphalt containing heavy crude oil:

*Example 2*

A cracked residuum obtained from cracking heavy California crude oil and having the following properties:

| | | |
|---|---|---|
| Gravity | °A. P. I | 8.1 |
| Flash | °F | 225 |
| Fire | °F | 300 |
| Viscosity, S. U. at 100° F | sec | 1200 | was treated with three times its volume of a saturated solvent oil derived as a raffinate from liquid sulphur dioxide treatment of California lubricating oil stock having a viscosity of 120 sec. S. U. at 100° F. Upon settling the precipitated asphalt was removed. The solvent oil was removed by distillation under vacuum and the bottoms from the distillation was treated with liquid sulphur dioxide. For this purpose two volumes of sulphur dioxide was used for each volume of the bottoms. The treatment was carried on at 40° F. From this treatment, upon evaporation of the $SO_2$, a desired material comprising largely polymerized polynuclear cyclic hydrocarbons was obtained, suitable for producing the desired protective coating.

The material prepared according to the above methods when dried, or set, on surfaces gives an improved smooth finish which is permanent, with a high gloss which adds to its appearance. For this reason, the material is particularly useful as a primer, or first coating, on materials which may be finished with other paints and also gives the underlying surface a waterproof coat. The use of such a primer also eliminates the use of other relatively expensive primers which in no way approach the adhesive and penetrating qualities of the base.

It is believed that the high finish is due to certain bodies in the material in a high form of concentration which impart green fluorescence thereto. Such fluorescent qualities are valuable in imparting a desired green fluorescence to lubricating oil deficient in the same while the bodies themselves, being highly stabilized by heat treatment, materially aid in the stabilization of the lubricating oil under severe operating conditions.

Being asphalt free, the material may be added to a lubricating oil in percentages ranging from 1% to 20% by volume without danger of the accumulation of asphaltic materials in internal combustion engines and preferably the material so added for stabilization and/or coloring properties is selected, or manufactured, with the same viscosity and flash of the lubricating oil with which it is to be blended. This may be accomplished, for instance, by selecting suitable heavier polymerized material derived from a lighter oil than lubricating oil and by other methods.

In application to ships' bottoms, piling, termite control and the like, the material may well be mixed with percentages, ranging in volume from 0.1% to 9.99% of the material, of oil soluble toxic ingredients. For this purpose certain metal salts may be used, such as the resinates, oleates or naphthalenates of copper, mercury and other metals well known in the art to effect insecticidal, fungicidal, and marine vegetation control, as well as exercising its above described functions of surface protection in general.

The efficiency of the material appears to be largely controlled by its comparatively greater adhesiveness to all kinds of surfaces, due to surface tension conditions, which is far greater than that shown by ordinary paints, asphalt, etc.

It is valuable in the construction of roads by spraying, or other methods of application, on the stone whereby, due to its penetrating and adhesive qualities, it is enabled to function as a waterproof binder with or without the use of asphalt. As an initial primer to rocks, stone, etc., used in roads, combined with a finishing coat after the usual asphalt mix is laid, it is especially useful.

To such material, as required for application, may be added various thinners which are separated therefrom after application to a surface by evaporation, absorption, heat, or other physical phenomena, and such thinners should make the components of this material a uniform and homogeneous solution, or colloidal suspension, so as to give uniform spread of the material.

In addition to a thinner, there may be added, if desired or necessary for a particular condition, certain pigments or heaviers such as an oxide of lead, zinc, titanium, iron, barium or chromium; carbon black; graphite; lead chromate; barium sulphate; Prussian blue and the like; which may advantageously modify the penetration control of the material and/or may change the tone or appearance of the material when applied and/or may increase the resistance to corrosive influence, and/or may add to the effective life of the material by increased thickness thereof.

This application is a continuation-in-part of our copending applications Serial Numbers 50,474 and 85,326, filed November 18, 1935, and June 15, 1936, respectively.

We claim:

1. A metal surface protective covering consisting of an asphalt-free film comprising largely polymerized petroleum hydrocarbons of the polynuclear cyclic type, said film being characterized by its resistance to deterioration at temperatures up to 1200° F.

2. A metal surface protective covering consisting of an asphalt-free film comprising largely polymerized petroleum hydrocarbons of the polynuclear cyclic type, said film being characterized by its resistance to corrosive or destructive gases of the group $CO_2$, $SO_2$, $H_2S$, $HCl$ at temperatures up to 1200° F.

3. A heat-resistant protective covering for highly heated metallic surfaces consisting of a film comprising a mixture of polymerized hydrocarbons of the aromatic and unsaturated types derived from petroleum which is characterized by its resistance to pyrolytic decomposition when subjected to temperatures at which its parent molecules will decompose.

4. A heat-resistant protective covering for highly heated metallic surfaces consisting of a film comprising a mixture of polymerized, asphalt free hydrocarbons of the aromatic and unsaturated types derived from petroleum which is characterised by its resistance to pyrolytic decomposition when subjected to temperatures at which its parent molecules will decompose.

5. A heat-resistant protective covering for highly heated metallic surfaces consisting of a film comprising a mixture of polymerized hydrocarbons of the aromatic and unsaturated types derived from petroleum which is characterized by its resistance to pyrolytic decomposition when oxidized and then subjected to temperatures at which its parent molecules will decompose.

6. A heat-resistant protective covering for highly heated metallic surfaces consisting of a film comprising polymerized aromatic hydrocarbons derived from petroleum characterized by their resistance to pyrolytic decomposition when subjected to temperatures at which their parent molecules will decompose.

THOMAS OLIVER EDWARDS, Jr.
STANLEY RUSSELL WILLIAMS.